| United States Patent [19] | [11] | 4,021,327 |
|---|---|---|
| Grot | [45] | May 3, 1977 |

[54] REINFORCED CATION PERMEABLE SEPARATOR

[75] Inventor: Walther Gustav Grot, Chadds Ford, Pa.

[73] Assignee: E. I. Du Pont de Nemours and Company, Wilmington, Del.

[22] Filed: Apr. 29, 1975

[21] Appl. No.: 572,832

[52] U.S. Cl. .................................. 204/296; 204/98
[51] Int. Cl.² ...................................... C25B 13/08
[58] Field of Search .................................. 204/296

[56] References Cited

UNITED STATES PATENTS

| 3,718,561 | 2/1973 | Jacob | 204/180 R |
|---|---|---|---|
| 3,799,743 | 3/1974 | Alexander et al. | 23/253 R |
| 3,853,721 | 10/1974 | Darlington et al. | 204/98 |
| 3,884,778 | 5/1975 | Eng et al. | 204/84 |
| 3,909,378 | 9/1975 | Walmsley | 204/98 |
| 3,930,979 | 1/1976 | Vallance | 204/252 |

*Primary Examiner*—F.C. Edmundson

[57] ABSTRACT

A cation permeable separator containing a polymer with ion exchange sites is reinforced with supporting fibers introduced into a polymer matrix in a fabric which also contains sacrificial fibers that are subsequently removed.

In electrolysis of brine, the use of this type of reinforced cation permeable separator positioned between anode and cathode compartments of an electrolytic cell has resulted in increased electrical efficiency and/or decreased voltage.

19 Claims, No Drawings

REINFORCED CATION PERMEABLE SEPARATOR

BACKGROUND OF THE INVENTION

The present invention relates to cation permeable separators which are particularly useful to divide anode and cathode compartments of an electrolytic cell.

In recent years development of cells which are useful for electrolysis of an alkali or alkaline earth metal halide solution by use of a cation permeable separator containing a polymer with ion exchange sites has been undertaken. These polymers have been made to have thermal and chemical stability necessary to manufacture highly reactive chemicals, e.g., electrolysis of brine to produce chlorine and caustic. In addition to chemical and thermal stability of the polymer, the electrolytic cell should be able to operate at a high cell efficiency and low power consumption.

From an economic standpoint recently developed electrolytic cells containing new types of cation permeable separators must be able to compete with proven electrolytic cells which are commercially such as, diaphragm cells, which employ asbestos as a separator, and mercury cells.

SUMMARY OF THE INVENTION

The present invention is directed to an improved cation permeable separator suitable for use in an electrolytic cell. The separator is reinforced with supporting fibers which are initially contained in a fabric which also contains sacrificial fibers which are subsequently removed from the fabric. The sacrificial fibers allow a decrease in the amount of support fibers necessary for uniform reinforcement of the separator.

Improved results in the electrolysis of brine have been found with use of the reinforced cation permeable separator positioned between an anode and cathode compartment in an electrolytic cell. More specifically, an increase in electrical efficiency and/or a decrease in voltage has resulted.

DETAILED DESCRIPTION

The cation permeable separator of the present disclosure contains a polymer with ion exchange sites in which reinforcement is necessary to increase the strength of the separator. Conventionally, the separator will contain the polymer in the form of a film with a separator thickness of no more than 30 mils, preferably no more than 20 mils and most preferably less than 12 mils. Due to the thinness of the polymer film, additional strength is necessary through supporting fibers.

A relatively large number of supporting fibers in the cation permeable separator is not desired since decreased electrical efficiency and/or increased voltage has been found to occur in operation of an electrolytic cell in comparison to the use of separators which contained fewer supporting fibers.

The employment of a small number of supporting fibers in a fabric of a loose or open weave or knit has proven unsatisfactory with shifting of the fibers relative to one another prior to the fibers being anchored or embedded as the reinforcing material. The nonuniformity in the reinforcement with bunching of the fibers is undesirable.

An additional effect has been observed by reinforcement with only a relatively small number of supporting fibers; namely, the surface of the cation permeable separator is not as smooth and flat in comparison to a separator containing a greater number of these fibers. After lamination to embed or anchor the supporting fibers, peaks and valleys may be seen on the surface of the separator with peaks outlining the position of the supporting fibers. A large number of reinforcing fibers tends to minimize the distance between peaks and valleys.

If the surface of the separator is not smooth and flat such as with a corrugated surface, bubbles may accumulate during electrolysis and act as an insulator. This effect has been observed in the corrugations on a surface of a separator facing the cathode compartment of an electrolytic cell. In the present disclosure it is desired to produce a similar effect as results with the use of a large number of supporting fibers and yet at the same time reduce the amount of supporting fibers needed to reinforce the separator.

The reinforcement for the cation permeable separators disclosed herein includes supporting fibers which are initially contained in a fabric which also contains sacrificial fibers which are subsequently removed, e.g. by chemical destruction by leaching. The sacrificial fibers are woven or knitted into the fabric and physically prevent the slippage of the supporting fibers. Prior to use as the reinforcement, the fabric may be handled in normal fashion without consideration to the type of knit or weave or the type and amount of supporting fibers which are present. By anchoring or embedding within a polymer matrix, the fabric initially employed as the reinforcement, slippage of the supporting fiber does not occur and the fibers do not move relative to one another. Additionally, the surface of the polymer can have the same degree of smoothness and flatness as if a greater number of supporting fibers were employed. Thereafter, the sacrificial fibers are removed resulting in a decrease in the amount of reinforcing fibers in the separator.

In the present disclosure "sacrificial fibers" are defined to mean fibers which can be removed without a detrimental effect on either an intermediate polymer which is a precursor to a polymer possessing ion exchange sites or a polymer with ion exchange sites. The sacrificial fibers are removed from either polymer leaving voids without interfering with the ion exchange capability of the final polymer. The manner of removal of the sacrificial fibers should not affect the supporting fibers employed to reinforce the separator.

The sacrificial fibers may be made from a number of suitable materials, e.g., synthetic polymers such as nylon, and cellulosic materials, e.g. cotton and rayon. The primary requirement of the sarcificial fibers is their removal without a detrimental effect on the polymer matrix. With this proviso, the chemical makeup of the sacrificial fibers is not critical. In similar fashion the manner of removal of the sacrificial fibers is not critical as long as this removal does not interfere with the ion exchange capability of the final capability of the final polymer in the cation permeable separator. For purposes of illustration, removal of sacrificial fibers of a cellulosic material such as rayon may be done with sodium hypochlorite.

The support fibers for reinforcement of the cation permeable separator may be made from conventional materials since their main purpose is to strengthen the separator. In lamination elevated temperatures such as between 240° to 320° C. are employed to embed the reinforcing material in an intermediate polymer and the support fibers should also be able to withstand these temperatures.

The cation permeable separator may be used in electrolysis to produce highly corrosive chemicals and the support fibers must withstand chemical attack. In the case of electrolysis of brine, the reinforcing fiber should withstand exposure to chlorine and caustic soda. Due to their chemical inertness, perfluorinated polymers have been found to be highly desirable. The polymers include those made from tetrafluoroethylene, tetrafluoroethylene and hexafluoropropylene, and copolymers of tetrafluoroethylene and perfluoro(alkyl vinyl ether) with an alkyl of 1 to 10 carbon atoms such as perfluoro(propyl vinyl ether). Supporting fibers of chlorotrifluoroethylene polymers are also useful.

The intermediate polymer which serves as the precursor to the polymer containing ion exchange sites is prepared from monomers which are fluorine-substituted vinyl compounds. The polymers include those made from at least two monomers with at least one of the monomers coming from each of the two groups described below. The first group comprises fluorinated vinyl compounds such as vinyl fluoride, hexafluoropropylene, vinylidene fluoride, trifluoroethylene, chlorotrifluoroethylene, perfluoro (alkyl vinyl ether), tetrafluoroethylene and mixtures thereof.

The second group is the sulfonyl containing monomers containing the precursor —SO$_2$F or —SO$_2$Cl. One example of such a comonomer is CF$_2$=CFSO$_2$F. Additional examples can be represented by the generic formula CF$_2$=CFR$_f$SO$_2$F wherein R$_f$ is a bifunctional perfluorinated radical comprising 2 to 8 carbon atoms. The particular chemical content or structure of the radical linking the sulfonyl group to the copolymer chain is not critical and may have fluorine, chlorine or hydrogen atoms attached to the carbon atom to which is attached the sulfonyl group, although the carbon atom must have at least one fluorine atom attached. If the sulfonyl group is attached directly to the chain, the carbon in the chain to which it is attached must have a fluorine atom attached to it. The R$_f$ radical of the formula above can be either branched or unbranched, i.e., straight chained and can have one or more ether linkages. It is preferred that the vinyl radical in this group of sulfonyl fluoride containing comonomers be joined to the R$_f$ group through an ether linkage, i.e., that the comonomer be of the formula CF$_2$=CFOR$_f$SO$_2$F. Illustrative of such sulfonyl fluoride containing comonomers

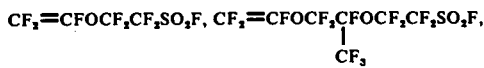

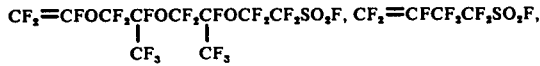

and 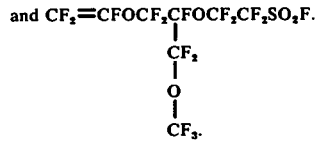

The most preferred sulfonyl fluoride containing comonomer is perfluoro(3,6-dioxa-4-methyl-7-octenesulfonyl fluoride),

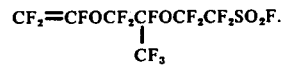

The sulfonyl containing monomers are disclosed in such references as U.S. Pat. No. 3,282,875 to Connolly et al. and U.S. Pat. No. 3,041,317 to Gibbs et al., U.S. Pat. No. 3,560,568 to Resnick and U.S. Pat. No. 3,718,627 to Grot.

The preferred intermediate copolymers are perfluorocarbon, i.e. perfluorinated, although others can be utilized as long as there is a fluorine atom attached to the carbon atom which is attached to the sulfonyl group of the polymer. The most preferred copolymer is a copolymer of tetrafluoroethylene and perfluoro(3,6-dioxa-4-methyl-7-octenesulfonyl fluoride) which comprises 10 to 60 percent, preferably 25 to 50 percent by weight of the latter.

The intermediate copolymer is prepared by general polymerization techniques developed for homo- and copolymerizations of fluorinated ethylenes, particularly those employed for tetrafluoroethylene which are described in the literature. Nonaqueous techniques for preparing the copolymers of the present invention include that of U.S. Pat. No. 3,041,317, to Gibbs et al. by the polymerization of the major monomer therein, such as tetrafluoroethylene, and a fluorinated ethylene containing sulfonyl fluoride in the presence of a free radical initiator, preferably a perfluorocarbon peroxide or azo compound, at a temperature in the range of 0°–200° C. and at pressures in the range 1–200 or more atmospheres. The nonaqueous polymerization may, if desired, be carried out in the presence of a fluorinated solvent. Suitable fluorinated solvents are inert, liquid, perfluorinated hydrocarbons, such as perfluoromethylcyclohexane, perfluorodimethylcyclobutane, perfluorooctane, perfluorobenzene, and the like.

Aqueous techniques for preparing the intermediate copolymer include contacting the monomers with an aqueous medium containing a free-radical initiator to obtain a slurry of polymer particles in non-water-wet or granular form, as disclosed in U.S. Pat. No. 2,393,967 to Brubaker, contacting the monomers with an aqueous medium containing both a free-radical initiator and a telogenically inactive dispersing agent, to obtain an aqueous colloidal dispersion of polymer particles, and coagulating the dispersion, as disclosed, for example, in U.S. Pat No. 2,559,752 to Berry and U.S. Pat. No. 2,593,583 to Lontz.

Conversion of the intermediate polymer to a polymer containing ion exchange sites is by conversion of the sulfonyl groups (—SO$_2$F or—SO$_2$Cl). The converted polymer is a fluorine-containing polymer with a plurality of sulfonyl groups present as ion exchange sites. These ion exchange sites will be contained in side chains of the polymer and will be attached to individual carbon atoms to which are attached at least one fluorine atom. Conversion of all or substantially all sulfonyl groups in the intermediate polymer to ion exchange sites is not necessary. This conversion may be in accordance with known techniques in the prior art, e.g., U.S. Pat No. 3,770,567 to Grot and U.S. Pat. No. 3,784,399 to Grot. Sulfonyl groups contained in the intermediate polymer can be converted to ion exchange sites present as —(SO$_2$NH)$_n$Q where Q is H, NH$_4$, cation of an alkali metal or cation of alkaline earth metal and $n$ is the valence of Q or to the form —(SO$_3$)$_n$Me where Me is a cation and n is the valence of the cation. Additional teachings of suitable ion exchange sites include the disclosures found in U.S. Pat. Ser. No. 406,361 filed Oct. 15, 1973 and U.S. Ser. No. 425,079 filed Dec. 17, 1973. For purposes of illustration the sulfonyl groups in the intermediate polymer may be reacted with a mono-, di-, or polyamine.

The fabric containing the sacrificial fibers and supporting fibers can be embedded within the separator in accordance with known methods. Conventionally, the fabric will first be embedded within or laminated into the intermediate polymer which is melt fabricable. Temperatures of 240° to 320° C. are suitable to embed the fabric in the intermediate polymer. A disclosure for a suitable technique is found in U.S. Pat. No. 3,770,567 to Grot.

After the fabric is embedded within the intermediate polymer, conversion of at least a portion of the sulfonyl groups to ion exchange sites is desirably undertaken. Although the sacrificial fibers may be removed prior to or at the time of conversion of the sulfonyl groups of the intermediate polymer to ion exchange sites, generally the removal will be subsequent to conversion of sulfonyl groups. The sacrificial fibers may remain in the separator until actual use in an electrolytic cell. In electrolysis of brine, the sacrificial fibers will be destroyed if made from nylon, rayon and the like. The removal of sacrificial fibers results in voids present in the separator.

The cation permeable separators useful herein fall into two general classes 1) separators which prevent any substantial hydraulic flow of liquid through the separator, and 2) microporous separators which allow liquid to hydraulically flow through the separator due to pores contained therein. The general types of separators and the manner of operation in an electrolytic cell is known and suitable disclosures in the prior art are set forth in U.S. Pat. Nos. 3,773,634 to Stacey; 3,775,272 to Davis; 3,863,226 to Spitzer and OS 2,243,866 to Darlington et al.

An improvement in use of a cation permeable separator in electrolysis of brine has been found to occur as evidenced by a reduction in voltage and/or an increase in electrical efficiency in operation of an electrolytic cell. The beneficial results from either of these characteristics directly translates into decreased power consumption for each unit of production, e.g. caustic soda and chlorine in the electrolysis of brine. With an improvement in electrical efficiency, an additional beneficial result is in the purity of the product produced. In a cell for electrolysis of brine employing a cation permeable separator which prevents any substantial hydraulic flow of liquid, hydroxyl ions will penetrate into the anode compartment and react with chlorine. With an increase in electrical efficiency, the number of hydroxyl ions which penetrate into the anode compartment will be reduced. With a microporous separator, anolyte flows through the separator to the cathode compartment. With an increase in cell efficiency, fewer impurities will be present in the caustic soda.

To account for the improvement in results in operation of an electrolytic cell but without being desired to be bound to any theory, the following explanation is given. A minimum amount of reinforcing fiber is necessary to impart strength and mechanical integrity to the cation permeable separator. The reinforcing fibers (particularly for separators which are substantially impervious to hydraulic flow) increase resistance to the flow of cations through the separator. The cations flow freely where windows exist in the separator, i.e., areas across the thickness of the separator where no reinforcing material is present. Increased resistance to flow of cations occurs where the supporting fibers are present since these fibers do not contain ion exchange sites. The reduction in the amount of reinforcing material means the overall area of windows is increased and translates into increased electrical efficiency and/or decreased voltage.

The removal of the sacrificial fibers leads to voids which do not provide a path for substantial hydraulic flow in separators which are substantially impervious to hydraulic flow with stagnant liquid accumulating in the voids.

With microporous cation permeable separators, a reduction in the amount of reinforcing material is also desirable. The maximization of windows for flow of cations across the separator is less critical. The separator has an inherently higher conductivity due to pores which are filled with a highly conductive anolyte. With microporous cation permeable separators the voids remaining after removal of the sacrificial fibers are highly desirable and these voids will be present both above and below the reinforcing fibers and will crisscross these fibers. The voids provide paths for optimum hydraulic flow of liquid around the reinforcing fibers and at the same time provide paths for increased current conductivity within the separator. Also, these voids after removal of the sacrificial fibers aid in the hydraulic flow of liquid which pushes back hydroxyl ions which would otherwise penetrate the separator and react as an impurity in the anode compartment. A flow of liquid directly across the width of the separator is undesirable since the optimum combination of optimum hydraulic flow and electrical conductivity is not present. In contrast, the pattern of voids left by removal of the sacrificial fibers permits the flow of anolyte in a path transverse to the width of the separator allowing a longer path of intersection with electrical current.

Although in the present disclosure, advantages have been set forth in the electrolysis of brine, the cation permeable separator can be generally employed in electrolytic cells including those used for electrolysis of alkali or alkaline earth metal halide solutions.

To illustrate the present invention, the following examples are provided.

EXAMPLES 1 and 2

In this and the following examples an intermediate polymer is employed of a copolymer of tetrafluoroethylene and

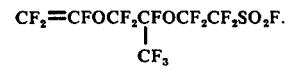

The equivalent weight of the polymer is given and is the weight of the polymer in grams containing one equivalent of potential ion exchange capacity.

A 7 mil film of 1200 equivalent weight intermediate polymer was surface-treated with ethylenediamine to a depth of 0.9 mils. Two portions of the film were then vacuum laminated to the following two reinforcements:
 1. A fabric consisting in both warp and fill of 14 threads per inch 200 denier Teflon polytetrafluoroethylene yarn and 56 threads per inch 50 denier rayon. This fabric was 6 mils thick.

2. As a control, a fabric was made by Stern & Stern Textiles (pattern T-12). This fabric consists of approximately 40 threads per inch 400 denier Teflon tetrafluoroethylene yarn in both warp and fill, and is approximately 10 mils thick.

After lamination, the two samples were treated with a hot solution of potassium hydroxide in aqueous dimethylsulfoxide to convert remaining —$SO_2F$ groups to —$SO_3K$ groups.

After the two laminated samples were removed from the hydrolysis bath, they were then soaked for one-half hour in dilute (~10%) sodium hydroxide. They were then mounted in turn in a laboratory electrolytic chlor-alkali cell. The electrodes used were a dimensionally stable anode from Electrode Corporation and a perforated stainless steel sheet cathode. The spacings between the laminated samples and each electrode were approximately one-eighth inch. Thin (~one-sixteenth inch) sheets of neoprene closed cell sponge were used as gasket materials.

During the two electrolysis examples, a salt solution made up of 160 g NaCl/liter of solution, 0.25 ml of concentrated HCl/liter of solution, and 0.022 g of sodium phosphate monobasic ($NaH_2PO_4 \cdot H_2O$)/liter of solution was fed continuously to the anode compartment. Outlet salt concentration was 135 g. NaCl/liter of solution. To the cathode compartment was added at the beginning of each example sufficient 10 N sodium hydroxide to fill the compartment. After that, nothing more was added to the cathode compartment throughout the duration of each electrolysis experiment.

As the cell was being heated to its final operational temperature of 80° C., the current density was gradually increased to its final value of 2 amperes/square inch. The cell was then run continuously at 80° C. and 2 amperes/square inch for several days, and then the cell efficiency was measured by comparing the amount of current passed through the cell. The results were as follows:

| Example | Cell Efficiency After 2 Days | Cell Voltage | Normality of Caustic Produced |
| --- | --- | --- | --- |
| 1) Laminate formed with Teflon/Rayon Fabric | 82% | 5.10 v | 11.8 N |
| 2) Laminate formed with T-12 Cloth (Control) | 82% | 5.63 v | 11.6 N |

Examination of Example 1 after removal from the cell revealed that the rayon had been destroyed during the electrolysis.

EXAMPLES 3 and 4

Two fabrics as described in Examples 1 and 2 were individually vacuum laminated to form a composite film of 4 miles of 1100 equivalent weight intermediate polymer and 1.5 mils of 1500 equivalent weight intermediate polymer. The fabric was contained in the 1100 equivalent weight polymer. After lamination, the sulfonyl groups of the intermediate polymer were converted to $SO_3K$ groups as described in Examples 1 and 2 followed by a treatment with a hot solution of sodium hypochlorite which destroys the rayon of Example 3.

After the two laminated samples were removed from the hydrolysis bath, they were boiled for one-half hour in distilled water. They were then mounted in a laboratory chlor-alkali cell similar to that in Example 1.

During the two electrolysis experiments, a salt solution of 25% by weight salt was fed continuously to the anode compartment. To the cathode compartment was added sufficient 5.5 N sodium hydroxide to fill the compartment. After that, sufficient distilled water was fed into the cathode compartment during each electrolysis experiment to maintain the catholyte normality at about 5.5–5.6 N.

After three days of operation at 80° C. and 2 amperes/square inch, the cell efficiency was measured by comparing the amount of sodium hydroxide produced with the amount of current passed through the cell. The results are as follows:

| Example | Cell Efficiency After 3 Days | Cell Voltage | Normality of Caustic Produced |
| --- | --- | --- | --- |
| 3) Laminate formed with 1.5 mils 1500 EW film, 4 mils 1100 EW film, and Teflon / rayon fabric | 73% | 3.8 v. | 5.6 N |
| 4) Laminate formed with 1.5 mils 1500 EW film, 4 mils 1100 EW film, and T-12 cloth (Control) | 70% | 4.3 v. | 5.5 N |

EXAMPLE 5

A microporous separator was formed by lamination of the following stack of materials in a vacuum laminator at approximately 280° C. for two minutes: offset printing paper (top), unfilled paper (nine pound weight) two plies facial tissue, 7 mil of 1200 equivalent weight intermediate polymer, one ply facial tissue, the Teflon/rayon fabric of Example 1, two plies facial tissue, unfilled paper (nine pound weight), 10 mil blotter paper (bottom). After lamination, the intermediate polymer had penetrated all five plies of facial tissue but had just barely touched the unfilled paper. The laminate was hydrolyzed in a solution of potassium hydroxide in aqueous dimethylsulfoxide and the paper and rayon destroyed by treatment with a hot solution of sodium hypochlorite.

The separator was then boiled for one hour in distilled water. While wet, it was mounted in a laboratory chlor-alkali cell similar to that of Example 1. In this case, however, the cell was fitted with a riser pipe such that the anolyte had a 16½ inch hydraulic head relative to that of the catholyte, and saturated brine was used as the anolyte feed.

To the cathode compartment was added sufficient 2 N NaOH to fill the compartment. No additional material was added to the cathode compartment for the duration of the experiment.

As the cell was heated to its final operating temperature of 80° C., the current density was gradually increased to its final value of 1 ampere/square inch. The cell was then run continuously for several days. At that point the current efficiency was measured by comparing the amount of sodium hydroxide produced with the amount of currency passed through the cell. The results were as follows:

| Normality of Caustic Produced | Cell Efficiency | Cell Voltage |
|---|---|---|
| 4.5 N | 98.1% | 3.45 v |
| 5.1 N | 97.4% | 3.47 v |

EXAMPLES 6 and 7

A portion of the unhydrolyzed laminate from Example 5 was then heated a second time under laminating conditions (15 minutes at 270° C.) to obtain a deeper penetration of the polymer into the paper. The sheet was then chemically treated as in the previous example. The resulting separator was then boiled in distilled water and mounted in the same laboratory chlor-alkali cell. Both the cell startup and cell operation were as described in Example 5. After several days of operation, the results were as follows:

| Normality of Caustic Produced | | Cell Efficiency | Cell Voltage |
|---|---|---|---|
| Example 6) | 4.7 N | 96.6% | 3.19 v |
| | 4.9 N | 98.1% | 3.17 v |

Similarly, separator was made in accordance with the procedures of Example 6 with the substitution of the T-12 fabric of Example 2. The remaining remarks of operating procedure made in reference to Example 6 apply to Example 7. The results of the control were as follows:

| Normality of Caustic Produced | Cell Efficiency | Cell Voltage |
|---|---|---|
| Example 7)(Control) 4.3N | 89.7% | 3.18 v |

EXAMPLES 8 and 9

A microporous separator was formed by lamination of the following stack of materials in a vacuum laminator at approximately 280° C. for two minutes: offset printing paper (top), two plies facial tissue, 7 mil of 1200 equivalent weight intermediate polymer, one ply facial tissue, the Teflon/rayon fabric of Example 1, two plies facial tissue, 10 mil blotter paper (bottom). The laminate was hydrolyzed in a solution of potassium hydroxide in aqueous dimethylsulfoxide and the paper and rayon destroyed by treatment with a hot solution of sodium hypochlorite.

The separator was then boiled for one hour in distilled water. While wet, it was mounted in a laboratory chlor-alkali cell similar to that of Example 1. In this case, however, the cell was fitted with a riser pipe such that the anolyte had a 16½ inch hydraulic head relative to that of the catholyte, and saturated brine was used as the anolyte feed.

To the cathode compartment was added sufficient 2 N NaOH to fill the compartment. No additional material was added to the cathode compartment for the duration of the experiment.

As the cell was heated to its final operating temperature of 80° C., the current density was gradually increased to its final value of 2 ampere/square inch. The cell was then run continuously for several days. At that point the current efficiency was measured by comparing the amount of sodium hydroxide produced with the amount of current passed through the cell. The results were as follows:

| Normality of Caustic Produced | | Cell Efficiency | Cell Voltage |
|---|---|---|---|
| Example 8) | 5.3 | 96.8 | 3.92 |

Similarly as in Example 8 a separator was made except for substitution of a T-12 polytetrafluoroethylene cloth for the rayon containing fabric operation in the chlor-alkali cell of Example 9 gave the following results:

| Normality of Caustic Produced | | Cell Efficiency | Cell Voltage |
|---|---|---|---|
| Example 9) (Control) | 5.0 N | 79.5% | 4.0 v |

What is claimed is:
1. A cation permeable separator substantially impervious to hydraulic flow of liquid comprising a fluorine-containing polymer with a plurality of sulfonyl groups present as ion exchange sites,
   said sulfonyl groups being contained in side chains and being attached to individual carbon atoms to which are attached at least one fluorine atom,
   said separator containing support fibers and containing voids which are formed by the removal of sacrificial fibers, said supporting fibers and sacrificial fibers initially comprising a fabric prior to formation of said voids.
2. The cation permeable separator of claim 1 wherein said fluorine-containing polymer is perfluorinated.
3. The cation permeable separator of claim 2 wherein said fluorine-containing polymer is a copolymer formed from tetrafluoroethylene and perfluoro(3,6-dioxa-4-methyl-7-octenesulfonyl fluoride).
4. The cation permeable separator of claim 1 wherein said support fibers comprise a perfluorinated polymer.
5. The cation permeable separator of claim 4 where said perfluorinated polymer is made from one or more monomers selected from tetrafluoroethylene, hexafluoropropylene and perfluoro(alkyl vinyl ether) with an alkyl of 1 to 10 carbon atoms.
6. The cation permeable separator of claim 1 in the form of a film with a thickness of no more than 30 mils.
7. The cation permeable separator of claim 6 wherein said thickness is no more than 20 mils.
8. The cation permeable separator of claim 7 wherein said thickness is no more than 12 mils.
9. A cation permeable separator comprising a fluorine-containing polymer with a plurality of sulfonyl groups present as ion exchange sites,
   said sulfonyl groups present as ion exchange sites being contained in side chains and being attached to individual carbon atoms to which are attached at least one fluorine atom,
   said separator containing a fabric comprising supporting fibers and sacrificial fibers.
10. A film comprising a fluorine-containing polymer with a plurality of sulfonyl groups present as $-SO_2X$ with X defining chlorine or fluorine,
    said sulfonyl groups being contained in side chains and being attached to individual carbon atoms to which are attached at least one fluorine atom, said film containing a fabric comprising supporting fibers and sacrificial fibers.

11. The film of claim 10 where X defines fluorine.

12. A microporous cation permeable separator capable of allowing hydraulic flow of liquid comprising a fluorine-containing polymer with a plurality of sulfonyl groups present as ion exchange sites, said sulfonyl groups being contained in side chains and being attached to individual carbon atoms to which are attached at least one fluorine atom, said separator containing supporting fibers and containing voids which are formed by the removal of sacrificial fibers, said supporting fibers and sacrificial fibers initially comprising a fabric prior to formation of said voids.

13. The cation permeable separator of claim 12 wherein said fluorine-containing polymer is perfluorinated.

14. The cation permeable separator of claim 13 wherein said fluorine-containing polymer is a copolymer formed from tetrafluoroethylene and perfluoro(3,6-dioxa-4-methyl-7-octenesulfonyl fluoride).

15. The cation permeable separator of claim 12 wherein said support fibers comprise a perfluorinated polymer.

16. The cation permeable separator of claim 15 where said perfluorinated polymer is made from one or more monomers selected from tetrafluoroethylene, hexafluoropropylene and perfluoro(alkyl vinyl ether) with an alkyl of 1 to 10 carbon atoms.

17. The cation permeable separator of claim 12 in the form of a film with a thickness of no more than 30 mils.

18. The cation permeable separator of claim 17 wherein said thickness is no more than 20 mils.

19. The cation permeable separator of claim 18 wherein said thickness is not more than 12 mils.

* * * * *